United States Patent
Agrawal et al.

(10) Patent No.: US 11,908,356 B2
(45) Date of Patent: Feb. 20, 2024

(54) AUGMENTED REALITY DISPLAY DEVICE HAVING CONTEXTUAL ADAPTIVE BRIGHTNESS

(71) Applicant: MOTOROLA MOBILITY LLC, Wilmington, DE (US)

(72) Inventors: Amit Kumar Agrawal, Bangalore (IN); Alexandre Neves Creto, Sao Paulo (BR)

(73) Assignee: Motorola Mobility LLC, Chicago, IL (US)

( * ) Notice: Subject to any disclaimer, the term of this patent is extended or adjusted under 35 U.S.C. 154(b) by 85 days.

(21) Appl. No.: 17/551,730

(22) Filed: Dec. 15, 2021

(65) Prior Publication Data

US 2023/0186800 A1 Jun. 15, 2023

(51) Int. Cl.
| | |
|---|---|
| *G09G 3/00* | (2006.01) |
| *G06V 40/18* | (2022.01) |
| *G06T 11/00* | (2006.01) |
| *G06T 19/20* | (2011.01) |
| *H04N 1/60* | (2006.01) |
| *H04N 5/57* | (2006.01) |

(Continued)

(52) U.S. Cl.
CPC ............ *G09G 3/003* (2013.01); *G06V 40/18* (2022.01); *G09G 2320/0626* (2013.01); *G09G 2360/144* (2013.01)

(58) Field of Classification Search
CPC .. G09G 3/003; G09G 5/02; G09G 2320/0626; G09G 2320/0666; G09G 2320/0671; G09G 2360/144; G06T 11/001; G06T 19/006; G06T 19/20; G06T 2207/10024; G06T 15/50; G06T 5/00; G06V 40/16; G02B 2027/0138; G02B 27/0147; H04N 1/60; H04N 5/57–58; H04N 9/64; H04N 9/67–9/69; H04N 9/73; H04N 23/10–11; H04N 23/13–16

See application file for complete search history.

(56) References Cited

U.S. PATENT DOCUMENTS

| | | | | |
|---|---|---|---|---|
| 9,530,342 | B2 * | 12/2016 | Bell | ....................... G09G 3/007 |
| 2017/0337742 | A1 * | 11/2017 | Powderly | ............. G06K 7/1408 |

(Continued)

FOREIGN PATENT DOCUMENTS

| | | | | | |
|---|---|---|---|---|---|
| CA | 2963116 | C | * | 6/2018 | ............. G09B 23/30 |
| CN | 103946732 | B | * | 6/2019 | ......... G02B 27/0093 |

*Primary Examiner* — Wesner Sajous
(74) *Attorney, Agent, or Firm* — Isidore PLLC

(57) ABSTRACT

An electronic device, computer program product, and method present augmented reality (AR) imagery at an AR display device with contextual, adaptive brightening control. The AR display device includes eyeglasses having lenses positioned in front of eyes of a person. A first camera sensor detects ambient light. An AR projector displays AR imagery on the lenses. A second camera sensor is configured to detect whether the eyes of the person are open or closed. A controller of the electronic device is communicatively coupled to the AR display device. The controller detects brightness of the ambient light. The controller dynamically adjusts brightness of the AR imagery in relation to the brightness of the ambient light. The controller reduces the brightness of the AR imagery in response to determining a brightness context that the eyes of the person have been closed for longer than threshold period of time.

20 Claims, 7 Drawing Sheets

(51) Int. Cl.
*H04N 9/64* (2023.01)
*H04N 9/69* (2023.01)
*H04N 9/73* (2023.01)
*G02B 27/01* (2006.01)

(56) References Cited

U.S. PATENT DOCUMENTS

| | | | |
|---|---|---|---|
| 2018/0168015 A1* | 6/2018 | Casey | G06T 7/11 |
| 2020/0310537 A1* | 10/2020 | Simmons | H04N 13/344 |
| 2020/0409456 A1* | 12/2020 | Norton, Jr. | G06V 40/18 |
| 2023/0004008 A1* | 1/2023 | Samec | A61B 5/361 |

\* cited by examiner

AUGMENTED REALITY DISPLAY DEVICE HAVING CONTEXTUAL ADAPTIVE BRIGHTNESS

BACKGROUND

1. Technical Field

The present disclosure relates generally to electronic devices, and more particularly to electronic devices having an adaptive reality display device.

2. Description of the Related Art

Augmented reality (AR) technology has been integrated into user worn eyeglasses and other user worn devices to provide a heads-up display that is positioned before the eyes of a user. The AR technology combines natural imagery with displayed AR imagery in an AR display device to provide the user with a more intuitive, immersive experience. When using the AR display device, the user receives a combination of ambient light from the environment and light projected from the AR display device. The brightness of the ambient light illuminating the natural imagery varies from low or little light to bright light, and the brightness change from low to bright and vice-versa may be gradual or abrupt. Some AR display devices incorporate manual or automatic brightness controls for the AR content to approximate the same brightness of natural imagery and AR imagery so neither imagery is overwhelmed by the other.

However, current AR brightness controls lack the ability for contextual adjustment and does not accommodate physiological adjustments made by the user's eyes. In an example, a user closes his eyes for a period of time sufficient for the pupils of the eyes to dilate in response to the apparent reduced light. Once the eyes open again, the amount of light coming from the natural imagery and from the AR imagery may be uncomfortable and even painful, given the context of the user.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
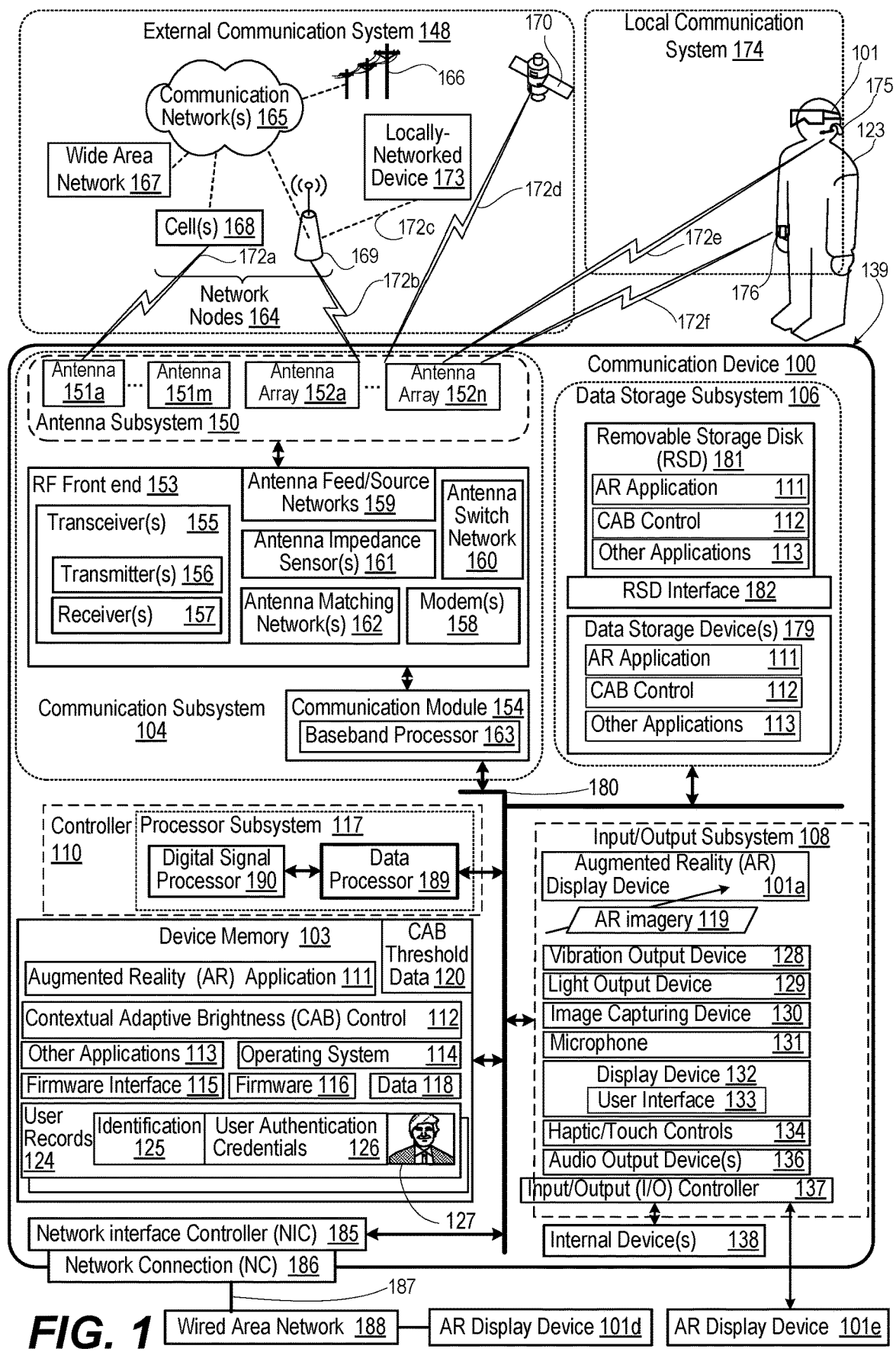
FIG. 1 depicts a functional block diagram of a communication environment including a communication device having components that provides augmented reality (AR) imagery with contextual adaptive brightness (CAB) control at an AR display device, and within which the features of the present disclosure are advantageously implemented, according to one or more embodiments.

According to a first aspect of the present disclosure, an electronic device, a computer program product, and a method present augmented reality (AR) imagery at an AR display device with contextual, adaptive brightness control. The AR display device includes eyeglasses having one or more lenses configured to be positioned in front of eyes of a person. The AR display device includes at least one first camera sensor that detects ambient light. The AR display device includes an AR projector that displays AR imagery on the one or more lenses. The AR display device includes at least one second camera sensor configured to detect whether the eyes of the person are open or closed. A controller of the electronic device is communicatively coupled to the AR display device. The controller detects brightness of the ambient light and an open state of the person's eyes. The controller dynamically adjusts brightness of the AR imagery in relation to the brightness of the ambient light when the person's eyes has not been recently closed for longer than a threshold period of time. The controller automatically reduces the brightness of the AR imagery in response to determining a brightness context that the eyes of the person have been closed for longer than the threshold period of time.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of an electronic device, specifically communication device 100, that provides AR imagery with contextual, adaptive brightness control at AR display device(s) 101a-101e (collectively 101), within an operating environment in which several of the features of the present disclosure are advantageously implemented. Referring now to the specific component makeup and the associated functionality of communication device 100. Communication device 100 may be communicatively coupled to one or more AR display devices 101a-101e respectively by an interlinked connection, wireless connection, cellular connection, network connection, or peripheral (tethered) connection. Communication device 100 enables one or more of AR display device(s) 101a-101e to provide a more intuitive and informative user interface. In one or more embodiments, communication device 100 includes device memory 103, communication subsystem 104, data storage subsystem 106, and input/output (I/O) subsystem 108. Device memory 103 and each subsystem (104, 106, and 108) are managed by controller 110. Device memory 103 includes program code for applications, such as augmented reality (AR) application 111, contextual adaptive brightness (CAB) control 112, and other application(s) 113. Device memory 103 further includes operating system (OS) 114, firmware interface 115, such as basic input/output system (BIOS) or Uniform Extensible Firmware Interface (UEFI), and firmware 116.

Controller 110 includes processor subsystem 117, which executes program code to provide operating functionality of communication device 100 that associates and communicates AR imagery at AR display device(s) 101a-101e. The software and/or firmware modules have varying functionality when their corresponding program code is executed by processor subsystem 117 or secondary processing devices within communication device 100. Processor subsystem 117 of controller 110 can execute program code of AR application 111, CAB control 112, and other application(s) 113 to configure communication device 100 to perform specific functions. Device memory 103 can include data 118 used by the applications. In one or more embodiments, controller 110 executes AR application 111 to present AR imagery 119 at a particular one of AR display device(s) 101a-101e. CAB control 112 uses CAB threshold data 120 to provide contextual adaptive brightness control. In one or more embodiments, AR application 111 attempts to authenticate person 123 by accessing user records 124 that may contain identification information 125, user authentication credentials 126, and/or biometric information, such as a digital image 127. Person 123 may be a human person, an animal, or an artificial person.

I/O subsystem 108 includes user interface components such as vibration output device 128, light output device 129, image capturing device(s) 130, microphone 131, display device 132 that presents user interface 133, touch/haptic controls 134, and audio output device(s) 136. I/O subsystem 108 also includes I/O controller 137. I/O controller 137 provides communication and power signals to functional components of device memory 103, communication subsystem 104, data storage subsystem 106, or I/O subsystem 108. I/O controller 137 connects to internal devices 138, which are internal to housing 139. I/O controller 137 connects to tethered peripheral devices such as AR display device 101e, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices, such as AR display device 101e, and other components of communication device 100 that use a different configuration for inputs and outputs.

Communication device 100 may be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the communication components and features of communication device 100. Communication subsystem 104 of communication device 100 enables wireless communication with external communication system 148. Communication subsystem 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received from external communication system 148 using by antenna subsystem 150. The received signal is amplified and filtered by receiver(s) 157, which demodulate received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceiver(s) 155. Antenna matching network(s) 162 can also be used to detune the impedance of lower band antennas 151a-151m to not match the impedance of transceiver(s) 155 to electromagnetically isolate a particular antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks to communication device 100. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas (151a-151m, 152a-152n) are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node(s) 169. In one or more particular embodiments, access node(s) 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node(s) 169. Communication subsystem 104 receives GPS signal(s) 172d broadcast by GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with wireless headset 175. Communication subsystem 104 communicates via second low power wireless communication channel(s) 172f, such as Bluetooth, with smart watch 176 such as used by person 123. Communication subsystem 104 can also communicate via wireless mesh protocols such as Zigbee, which is a short-range, low-power, wireless standard (IEEE 802.15.4).

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as AR application 111, CAB control 112, and other application(s) 113 that support or enhance the functionality of AR display device(s) 101a-101e. These applications can be loaded into device memory 103 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for AR application 111, CAB control 112, and other application(s) 113.

In one or more embodiments, I/O subsystem 108 includes network interface controller (NIC or "network interface") 185 with a network connection (NC) 186. Network cable 187 connects NC 186 to wired area network 188. NIC 185 can be referred to as a "network interface" that can support one or more network communication protocols. Wired area network 188 can be a local area network (LAN), a campus area network (CAN), a metropolitan area network (MAN), or a wide area network (WAN). For example, NC 186 can be an Ethernet connection. In one embodiment, AR display device 101d is communicatively coupled to wired area network 188.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 117, which includes one or more central processing units (CPUs), depicted as data processor 189. Processor subsystem 117 can include one or more digital signal processors 190 that are integrated with data processor 189. Processor subsystem 117 can include other processors that are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 103. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Figure 2A:
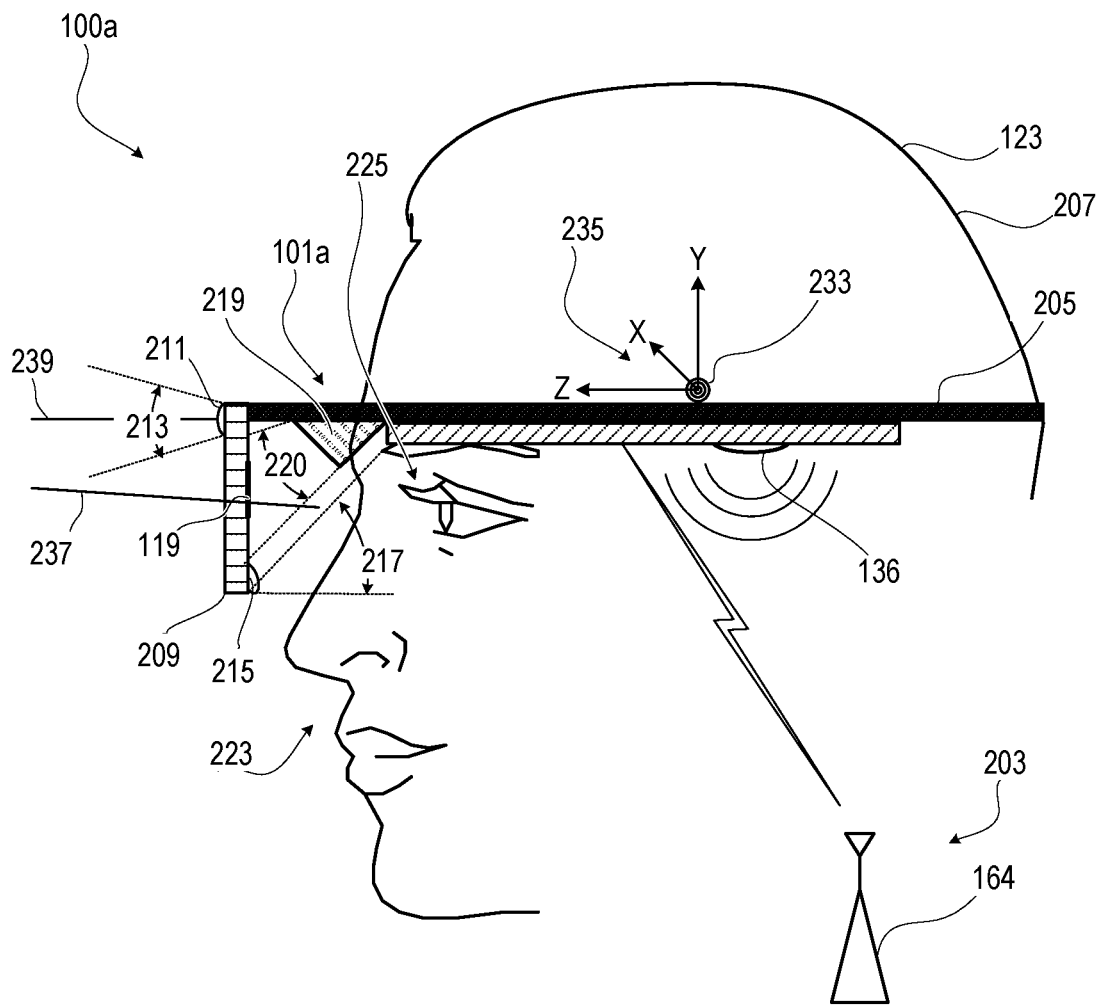
FIG. 2A depicts a first communication environment with an example communication device in communication with an AR display device assembly and with a communication network, according to one or more embodiments.

FIG. 2A depicts first communication environment 200a with communication device 100a communicatively connected via an interlinked connection with AR display device 101a. In one or more embodiments, communication device 101a may operate standalone. In one or more embodiments, communication device 101a may operate in communication with network node 164 of communication network 203. Communication device 100a is an implementation of communication device 100 of FIG. 1 and may have similar or identical components. Communication device 100a includes components that are compatible with a form factor for an article that is to be worn, carried, or stowed in a clothing pocket by person 123. In an example, communication device 100a includes visor or eyeglasses frame 205 that is received on head 207 of person 123 and supports communication device 100a including optical components of AR display device 101a. These optical components include: (i) lenses 209; (ii) first camera 211 that is forward oriented with a first FOV 213; (iii) second camera 215 that is aft oriented with a second FOV 217; and (iv) AR projector 219 having a field of focus 220 to project AR imagery 119 on lenses 209. In one or more embodiments, lenses 209 include an electrochromatic material that darkens in response to a control signal. With no control signal, the electrochromatic material is clear. With increasing voltage level of the control signal, the electrochromatic material becomes darker to a maximum achievable darkness level.

In accordance with one or more embodiments, communication device 100a may monitor an image stream from first camera 211 for an ambient light measurement. Communication device 100a may monitor an image stream from second camera 215 for imaging a portion of face 223 of person 123, such as for facial recognition or for detecting eye glance direction and eyelid position of eyes 225. AR imagery 119 is aligned with natural imagery by identifying a gaze direction of AR display device 101a. Communication device 100a translates and rotates with head 207. Communication device 100a may determine where head location 233 and head orientation 235 are relative to an interior space or relative to geospatial coordinates. As a first approximation of gaze direction 237 by person 123, boresight 239 of first image capturing device 211 within FOV 213 is oriented generally in line when eyes 225 are gazing straight ahead. As a second approximation of gaze direction 237, second image capturing device 215 directly detects gaze direction 237 of eyes 215.

Figure 2B:
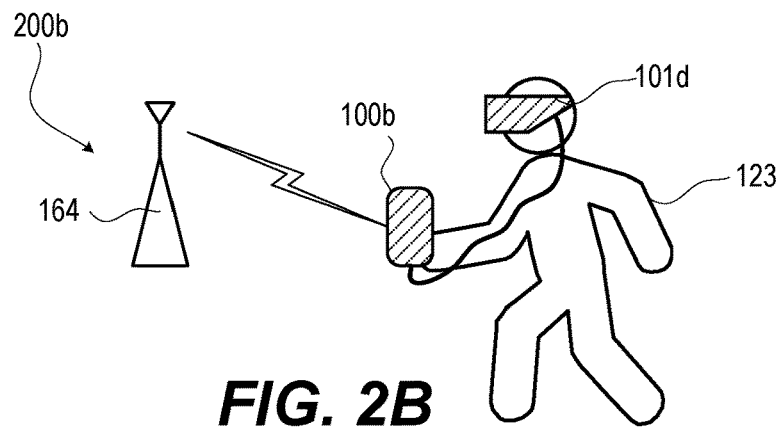
FIG. 2B depicts a second communication environment with a communication device that is communicatively coupled and tethered to an AR display device, according to one or more embodiments.

FIG. 2B depicts second communication environment 200b with communication device 100b communicatively coupled by a peripheral connection (tethered) to AR display 101d. Communication device 100b may connect to network node 164 for AR imagery. Controller 110 (FIG. 1) that provides functionality for contextual adaptive brightness control may reside in one or both of AR display 101b and communication device 100b. Communication device 100b is an implementation of communication device 100 of FIG. 1 and may have similar or identical components. Communication device 100b includes components that are compatible with a form factor for an article that is to be worn, carried, or stowed in a clothing pocket by person 123. Communication device 100b provides additional user interface features, communication capabilities, additional stored battery power, and content presentation features to AR display device 101d.

Figure 2C:
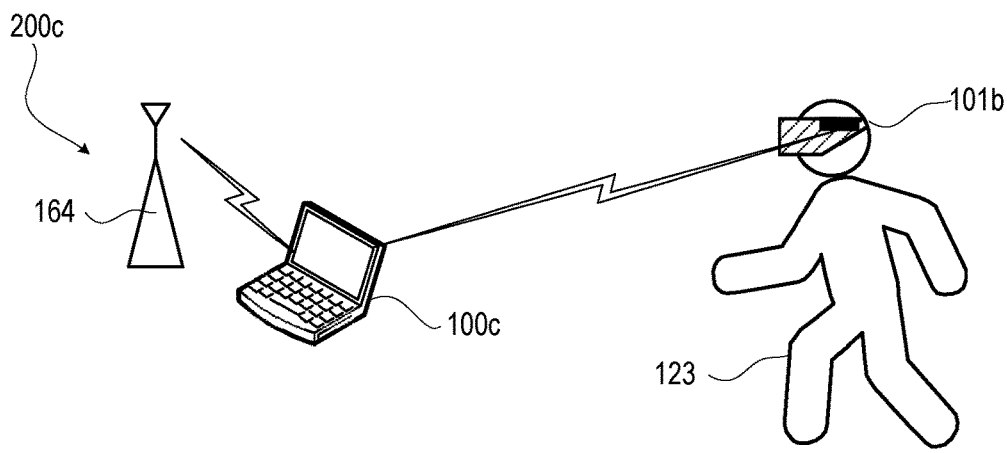
FIG. 2C depicts a third communication environment with a communication device that is communicatively coupled via a wireless connection to the AR display device, according to one or more embodiments.

FIG. 2C depicts third communication environment 200c with communication device 100c communicatively connected wirelessly to AR display device 101b. Communication device 100c may connect to network node 164 for AR imagery. Communication device 100c is an implementation of communication device 100 of FIG. 1 and may have similar or identical components. Communication device 100c includes components that are compatible with a form factor for fixed, portable, or mobile hand-carried implementations.

Figure 2D:
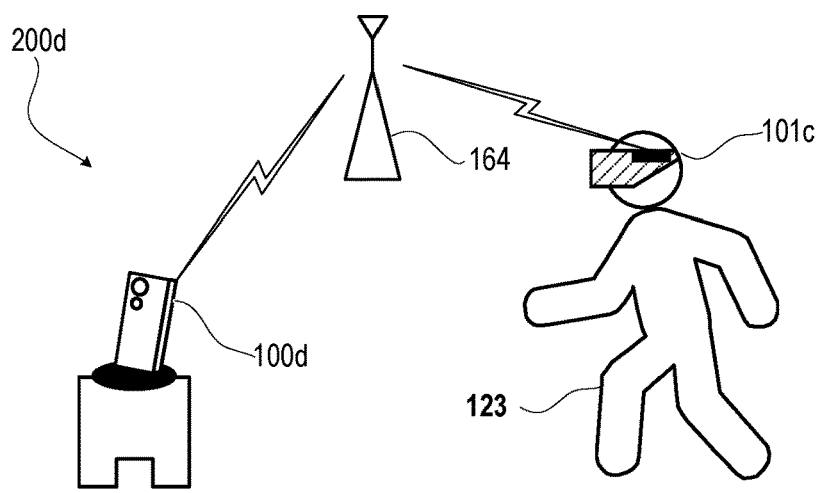
FIG. 2D depicts a fourth communication environment with communication device that is communicatively coupled via a cellular over-the-air connection to the AR display device, according to one or more embodiments.

FIG. 2D depicts fourth communication environment 200d with communication device 100d communicatively connected by a cellular over-the-air connection to AR display device 101c via one or more network nodes 164. Communication device 100c may connect to network node 164 to retrieve/download AR imagery and connects indirectly to AR display device 101c via network node 164. Communication device 100d is an implementation of communication device 100 of FIG. 1 and may have similar or identical components. Communication device 100d includes components that are compatible with a form factor for fixed, portable, or mobile hand-carried implementations.

Figure 3A:
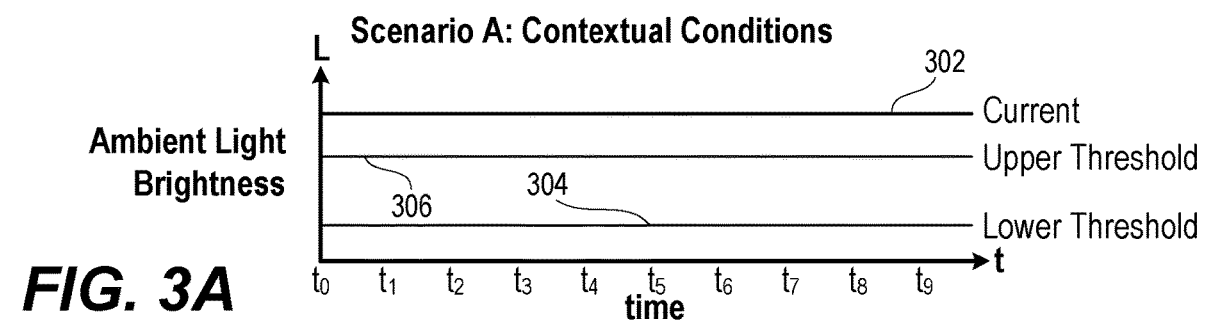
FIGS. 3A-3E depict a first scenario for contextual adaptive brightness control in response to eyes closed context of time plots respectively for ambient light brightness, eyes open/closed position, AR brightness, electrochromatic activation signal, and transmitted light brightness, according to one or more embodiments.
Figure 3B:
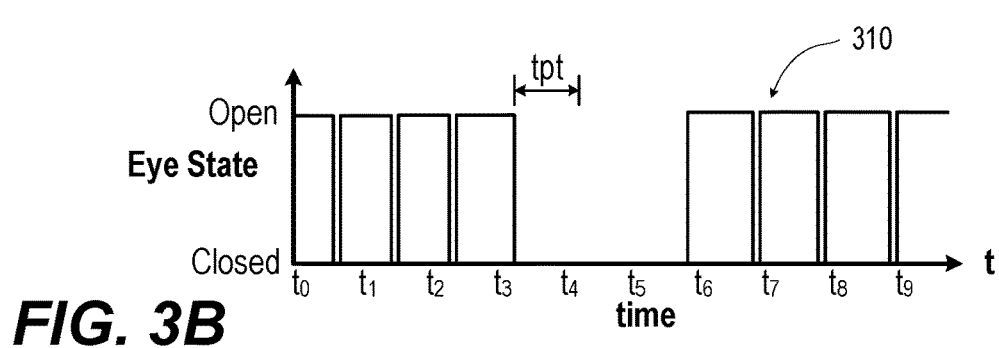
Figure 3C:
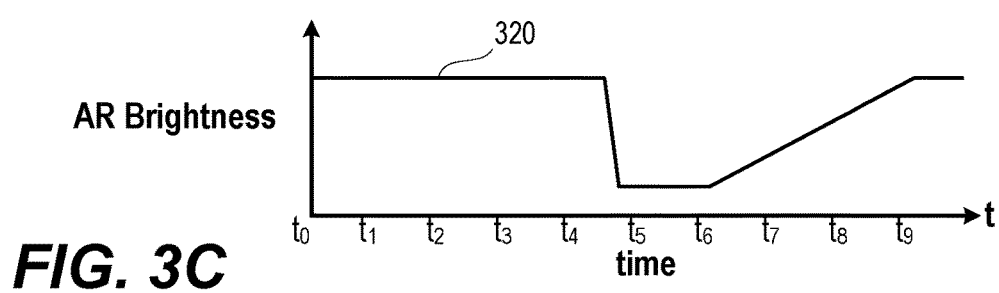
Figure 3D:
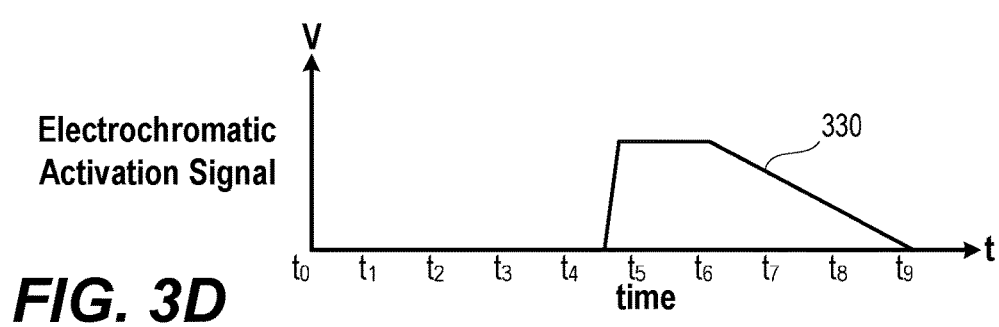
Figure 3E:
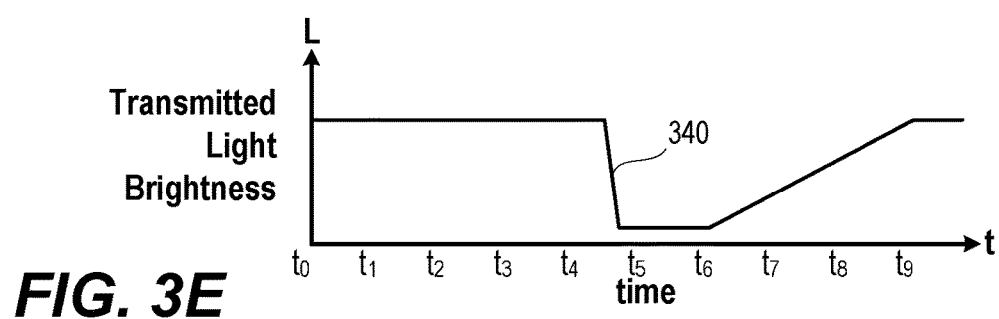

FIGS. 3A-3E depict a series of plots of brightness over time representing different scenarios for contextual adaptive brightness control in response to a first context scenario triggered by a user closing his eyes. The present disclosure provides AR contextual brightness controls that accommodate physiological adjustments made by the user's eyes when the user closes his eyes for a period of time sufficient for the pupils of the eyes to dilate in response to the apparent reduced light. Once the eyes open again, the amount of light coming from the natural imagery and from the AR imagery may be uncomfortable and even painful, given the context of the user. The AR contextual brightness controls mitigate this effect. Specifically, FIG. 3A presents plot 302 of ambient light brightness as a function of time. Ambient light brightness is constant above both lower brightness threshold 304 and upper brightness threshold 306 between time $t_0$ to time $t_9$. FIG. 3B presents plot 310 of eye position as a function of time. The eyes are generally open other than to blink between time $t_0$ to time $t_4$ and again between time $t_6$ to time $t_9$. The eyes close at time $t_4$ and exceed a threshold period of time (tpt) for contextual adaptive brightness control at $t_5$, and open again at time $t_6$. FIG. 3C presents plot 320 of AR brightness as a function of time. Prior to triggering contextual adaptive brightness control at time $t_5$, AR brightness is at level appropriate for the ambient light brightness. At time $t_5$, AR brightness is reduced to a minimum level. At time $t_6$, AR brightness gradually ramps back up the original level in response to the eyes being open. FIG. 3D presents plot 330 of an electrochromatic activation signal as a function of time. From time to to time $t_5$, electrochromatic activation signal is off. When the user keeps his eyes open other than to blink, the pupils dilate to correspond to the amount of light that is entering the eyes. Adaptive brightness controls can be used to keep natural imagery and AR imagery in corresponding brightness levels. A contextual change is made when determining that the user is not keeping his eye open sufficiently for adaptive brightness controls to suffice. When contextual, adaptive brightness control is triggered at time $t_5$, the electrochromatic activation signal switches to a high level, corresponding to a high darkness level of the electrochromatic material When the person's eyes open at time $t_6$, the electrochromatic activation signal ramps down gradually, reaching the off state again at time $t_9$. FIG. 3E presents plot 340 of transmitted light brightness as a function of time. From time $t_0$ to time $t_5$, the ambient light brightness is allowed to transmit through the lenses. A reduction in transmitted light brightness between time $t_5$ to time $t_9$ corresponds to activation of the electrochromatic lenses.

Figure 4A:
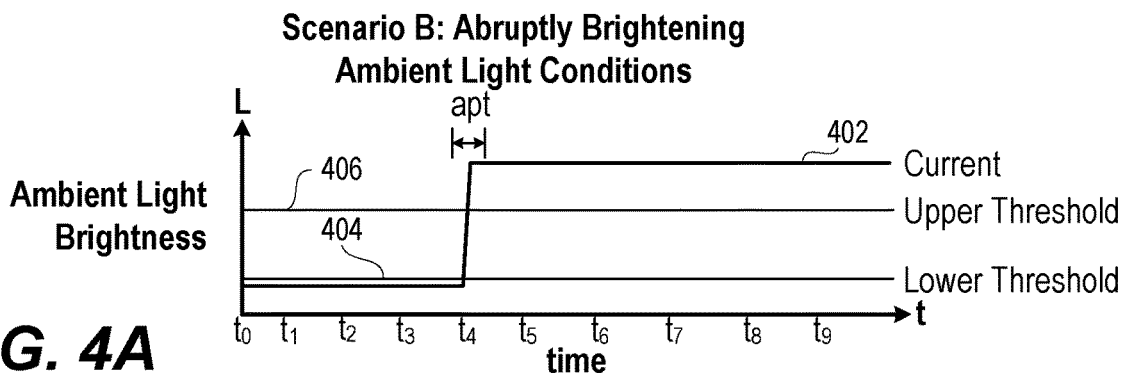
FIGS. 4A-4E depict a second scenario for contextual adaptive brightness control in response to an abrupt brightening event of time plots respectively for ambient light brightness, eyes open/closed position, AR brightness, electrochromatic activation signal, and transmitted light brightness, according to one or more embodiments.
Figure 4B:
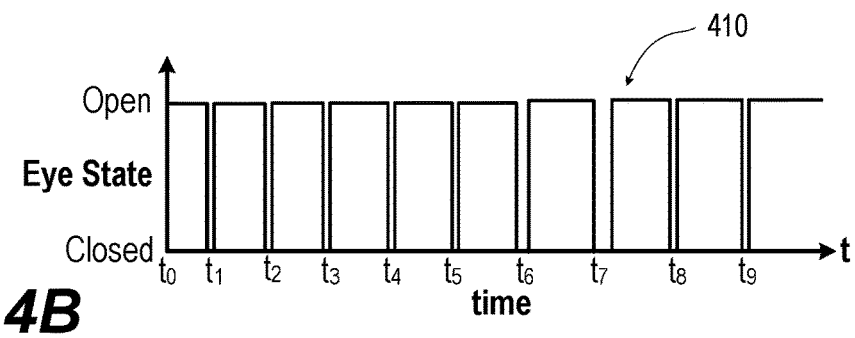
Figure 4C:
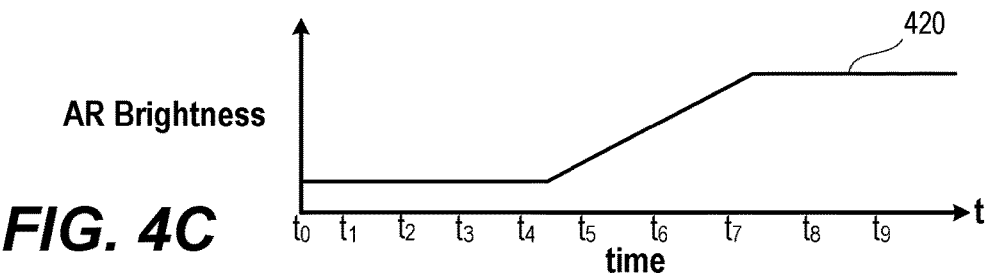
Figure 4D:
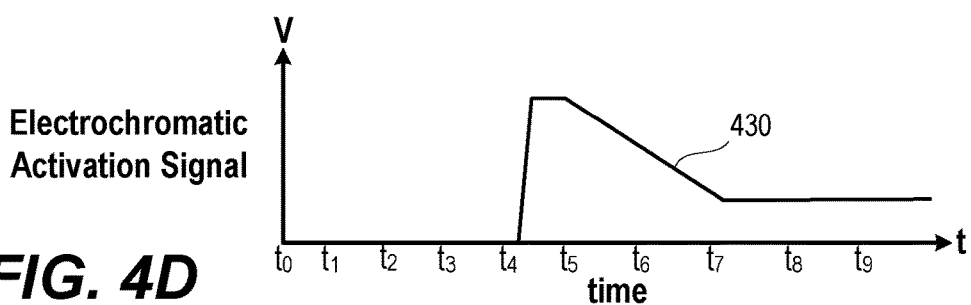
Figure 4E:
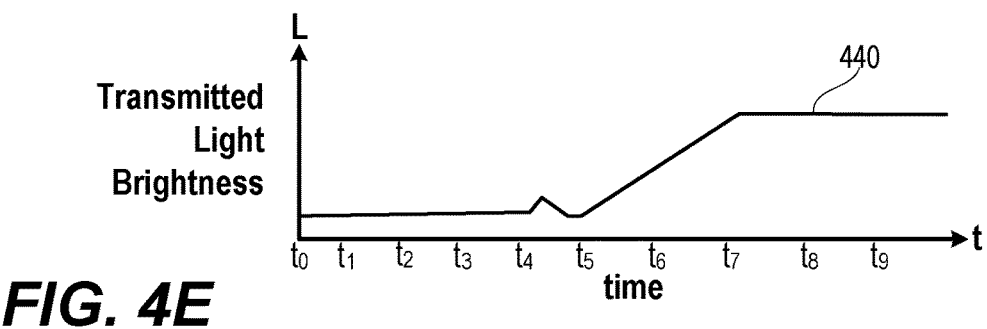

FIGS. 4A-4E depict a second scenario for contextual adaptive brightness control in response to an abrupt brightening event. FIG. 4A presents plot 402 of ambient light brightness as a function of time. Ambient light brightness is below lower brightness threshold 404 between time $t_0$ to time $t_4$. In less than abrupt period of time (apt) at time $t_4$, ambient light brightness increases to be above upper brightness threshold 406. Ambient light brightness remains high through time $t_9$. FIG. 4B presents plot 410 of eye position as a function of time. The eyes are generally open other than to blink between time $t_0$ to time $t_9$, thus creating no trigger for contextual adaptive brightness control. FIG. 4C presents plot 420 of AR brightness as a time of time. Prior to triggering contextual adaptive brightness control at time $t_4$, AR brightness is at low level appropriate for the low ambient light brightness. At time $t_4$, AR brightness gradually ramps up to a high level corresponding to the high ambient light brightness at time $t_7$ when contextual adaptive brightness control is deactivated. FIG. 4D presents plot 430 of an electrochromatic activation signal as a function of time. From time $t_0$ to time $t_4$, electrochromatic activation signal is off. When contextual, adaptive brightness control is triggered at time $t_4$, the electrochromatic activation signal switches to a high level. When the eyes open at time $t_6$, the electrochromatic activation signal ramps down gradually, reaching a low level state at time $t_7$ when contextual adaptive brightness control is deactivated. The low level state is part of adaptive brightness control, responding to the ambient brightness level being too bright either for user comfort or for effective combination with AR imagery. FIG. 4E presents plot 440 of transmitted light brightness as a function of time. From time $t_0$ to time $t_4$, the low ambient light brightness is allowed to transmit through the lenses without reduction. A reduction in transmitted light brightness between time $t_5$ to time $t_9$ corresponds to activation of the electrochromatic lenses. The transmitted light brightness ramps up and then is held below the upper brightness threshold.

Figure 5A:
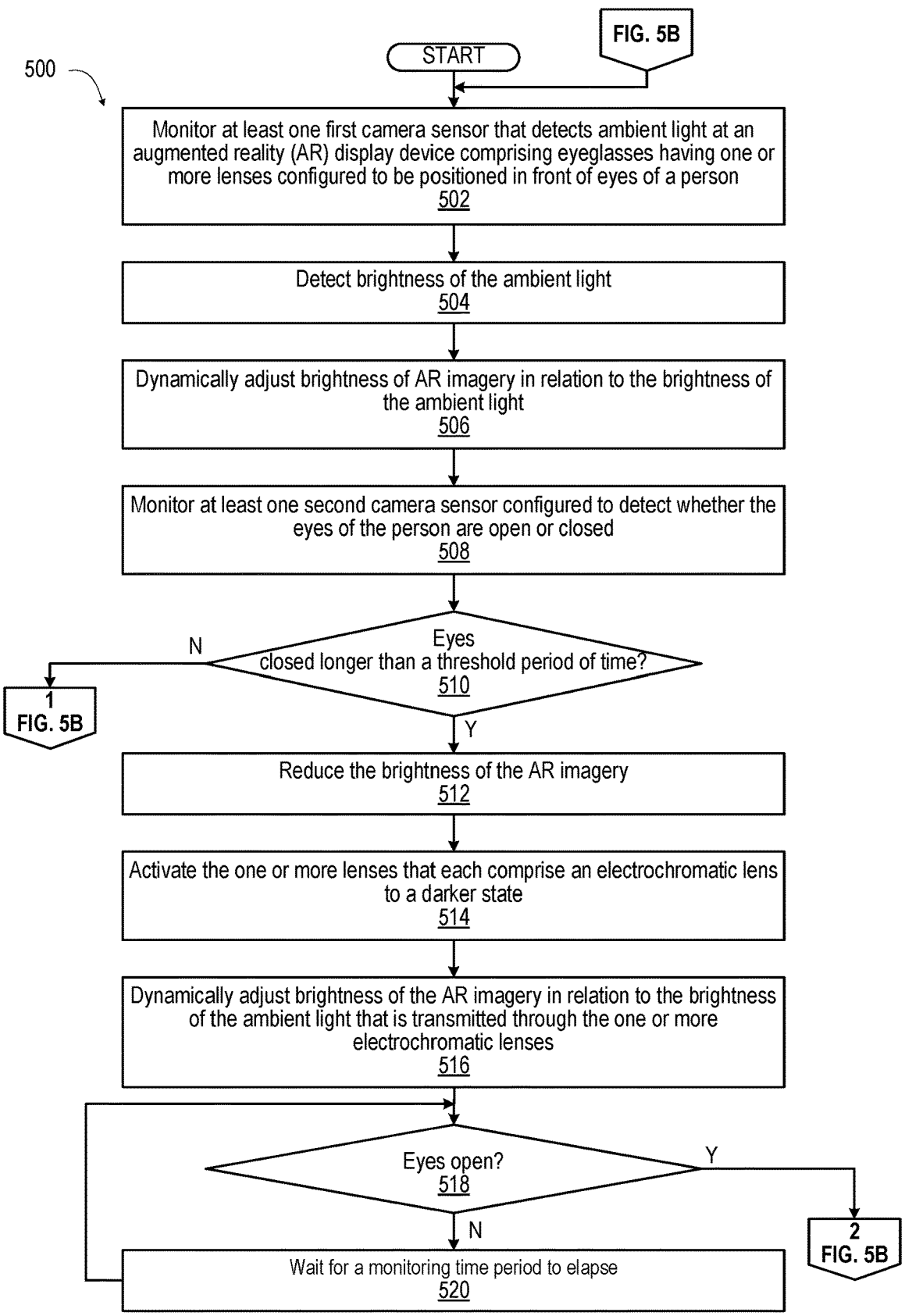
FIGS. 5A-5B (collectively FIG. 5) present a flow diagram of a method performed by a communication device for presenting AR imagery with contextual adaptive brightness control, according to one or more embodiments.
Figure 5B:
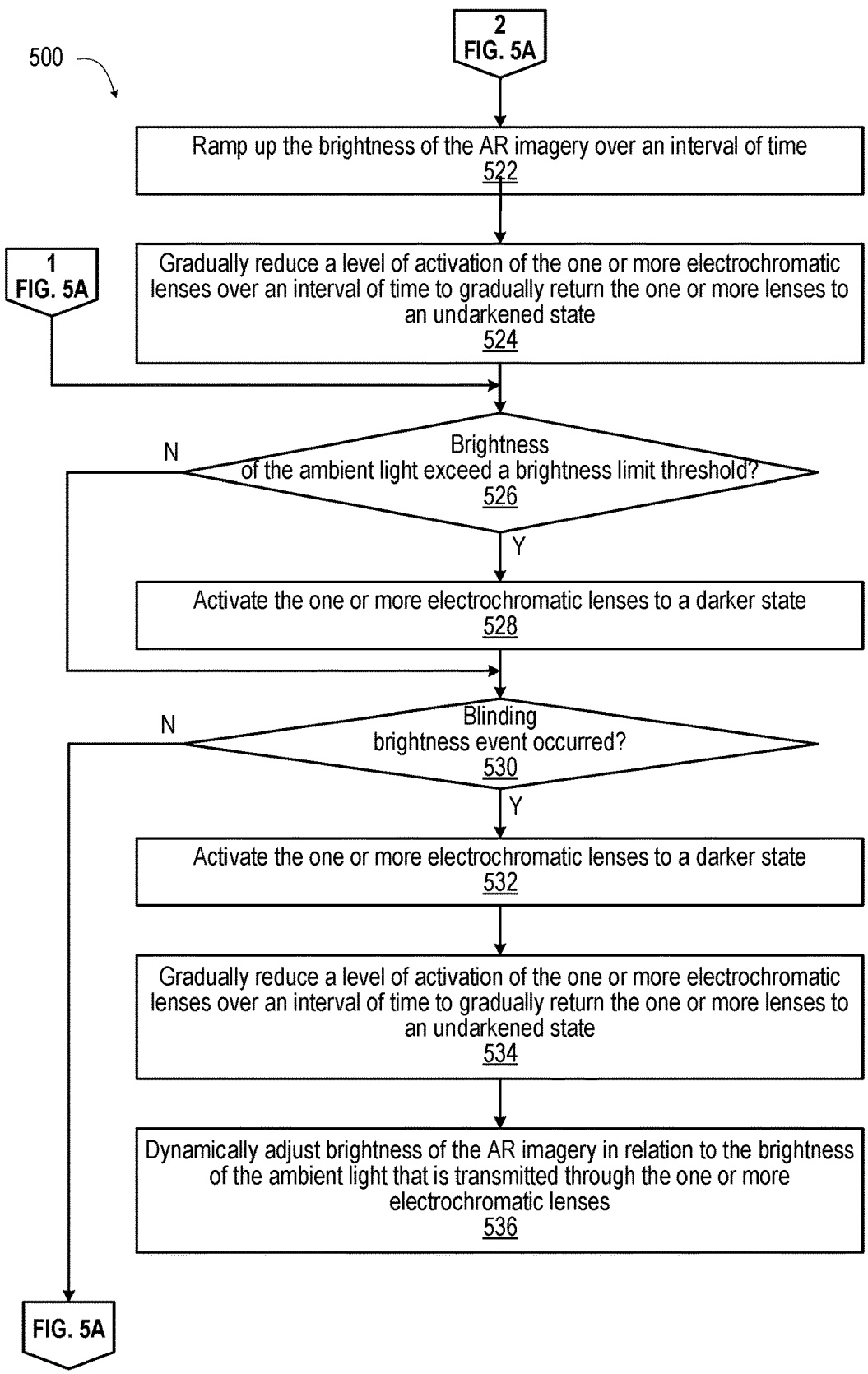

FIGS. 5A-5B (collectively FIG. 5) present a flow diagram of method 500 performed by an electronic device, such as the communication device, for presenting AR imagery with contextual adaptive brightness control. The descriptions of method 500 is provided with general reference to the specific components illustrated within the preceding FIGS. 1, 2A-2D, 3A-3E, and 4A-4E and specific components referenced in method 500 may be identical or similar to components of the same name used in describing preceding FIGS. 1, 2A-2D, 3A-3E, and 4A-4E. In one or more embodiments, controller 101 configures communication device 100 (FIG. 1) to provide functionality of method 500.

With reference to FIG. 5A, method 500 includes monitoring at least one first camera sensor that detects ambient light at an AR display device (block 502). AR display device includes eyeglasses having one or more lenses configured to be positioned in front of eyes of a person. Method 500 includes detecting brightness of the ambient light (block 504). In an example, method includes evaluating the colors and luminescence of the environment background to determine brightness. Method 500 includes dynamically adjusting brightness of AR imagery in relation to the brightness of the ambient light (block 506). The AR imagery is projected by an AR projector and displayed on the one or more lenses. Method 500 includes monitoring at least one second camera sensor configured to detect whether the eyes of the person are open or closed (block 508). Method 500 includes determining, in response to detecting that the eyes are closed, whether eyes are closed longer than a threshold period of time (decision block 510). In response to determining that the eyes are not closed longer than a threshold period of time, method 500 proceeds to block 526 (FIG. 5B). In response to determining that the eyes are closed longer than a threshold period of time, method 500 includes reducing the brightness of the AR imagery (block 512). In one or more embodiments, method 500 includes activating the one or more lenses that each comprise an electrochromatic lens to a darker state (block 514). Method 500 includes dynamically adjusting brightness of the AR imagery in relation to the brightness of the ambient light that is transmitted through the one or more electrochromatic lenses (block 516). Method 500 includes determining whether the eyes are open (decision block 518). In response to determining that the eyes are not open, method 500 includes waiting for a monitoring time period to elapse (block 520). Then method 500 returns to decision block 518. In response to determining that the eyes are open, method 500 proceeds to block 522 (FIG. 5B).

With reference to FIG. 5B, method 500 includes ramping up the brightness of the AR imagery over an interval of time (block 522). Method 500 includes gradually reducing a level of activation of the one or more electrochromatic lenses over an interval of time to gradually return the one or more lenses to an undarkened state (block 524). Method 500 includes determining whether the brightness of the ambient light exceeds a brightness limit threshold associated with effective presentation of the AR imagery (decision block 526). In response to determining that the brightness of the ambient light exceeds the brightness limit threshold associated with effective presentation of the AR imagery, method 530 includes activating the one or more electrochromatic lenses to a darker state (block 528). In response to determining that the brightness of the ambient light does not exceed the brightness limit threshold associated with effective presentation of the AR imagery or after block 528, method 530 includes determining whether an abrupt, blinding brightness event occurred (decision block 530). In one or more embodiments, method 500 includes determining that the abrupt, blinding brightness event has occurred in response to determining that: (i) a level of increase in the brightness of the ambient light is greater than a brightness increase threshold; and (ii) the increase occurs in less than threshold period of time. In response to determining that the abrupt, blinding brightness event has not occurred, method 500 returns to block 502 (FIG. 5A). In response to determining that the abrupt, blinding brightness event has occurred, method 500 includes activating the one or more electrochromatic lenses to a darker state (block 532). Method 500 includes gradually reducing a level of activation of the one or more electrochromatic lenses over an interval of time to gradually return the one or more lenses to an undarkened state (block 534). Method 500 includes dynamically adjusting brightness of the AR imagery in relation to the brightness of the ambient light that is transmitted through the one or more electrochromatic lenses (block 536). Then, method 500 returns to block 502 (FIG. 5A).

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:
1. An electronic device comprising:
   an augmented reality (AR) display device comprising:
      eyeglasses having one or more lenses configured to be positioned in front of eyes of a person;
      at least one first camera sensor that detects ambient light;

an AR projector that displays AR imagery on the one or more lenses; and
at least one second camera sensor configured to detect whether the eyes of the person are open or closed; and
a controller communicatively coupled to the AR display device, and which:
detects brightness of the ambient light;
dynamically adjusts brightness of the AR imagery in relation to the brightness of the ambient light; and
reduces the brightness of the AR imagery in response to determining a brightness context that the eyes of the person have been closed for longer than a threshold period of time.

2. The electronic device of claim 1, wherein the controller ramps up the brightness of the AR imagery over an interval of time in response to determining that the eyes of the person have opened subsequent to having been closed longer than the threshold period of time.

3. The electronic device of claim 1, wherein:
the one or more lenses comprise one or more electrochromatic lenses; and
the controller activates the one or more electrochromatic lenses to a darker state in response to determining that the eyes of the person have been closed longer than the threshold period of time.

4. The electronic device of claim 3, wherein the controller dynamically adjusts brightness of the AR imagery in relation to the brightness of the ambient light that is transmitted through the one or more electrochromatic lenses.

5. The electronic device of claim 1, wherein:
the one or more lenses comprise one or more electrochromatic lenses; and
the controller:
in response to determining that the eyes of the person have opened subsequent to having been closed longer than the threshold period of time:
gradually reduces a level of activation of the one or more electrochromatic lenses over an interval of time to gradually return the one or more lenses to an undarkened state.

6. The electronic device of claim 5, wherein the controller gradually increases the brightness of the AR imagery in relation to brightness of the ambient light allowed through the one or more electrochromatic lenses.

7. The electronic device of claim 1, wherein:
the one or more lenses comprise one or more electrochromatic lenses; and
the controller activates the one or more electrochromatic lenses to a darker state in response to determining that the brightness of the ambient light exceeds a brightness limit threshold associated with effective presentation of the AR imagery.

8. The electronic device of claim 1, wherein:
the one or more lenses comprise one or more electrochromatic lenses; and
the controller activates the one or more electrochromatic lenses to a darker state in response to determining that: (i) a level of increase in the brightness of the ambient light is greater than a brightness increase threshold; and (ii) the increase occurs in less than a second threshold period of time.

9. A method comprising:
monitoring at least one first camera sensor that detects ambient light at an augmented reality (AR) display device comprising eyeglasses having one or more lenses configured to be positioned in front of eyes of a person;
detecting brightness of the ambient light;
dynamically adjusting brightness of AR imagery in relation to the brightness of the ambient light, the AR imagery projected by an AR projector and displayed on the one or more lenses;
monitoring at least one second camera sensor configured to detect whether the eyes of the person are open or closed; and
reducing the brightness of the AR imagery in response to determining a brightness context that the eyes of the person have been closed for longer than threshold period of time.

10. The method of claim 9, further comprising ramping up the brightness of the AR imagery over an interval of time in response to determining that the eyes of the person have opened subsequent to having been closed longer than the threshold period of time.

11. The method of claim 9, further comprising activating the one or more lenses that each comprise an electrochromatic lens to a darker state in response to determining that the eyes of the person have been closed longer than threshold period of time.

12. The method of claim 11, further comprising dynamically adjusting brightness of the AR imagery in relation to the brightness of the ambient light that is transmitted through the one or more electrochromatic lenses.

13. The method of claim 9, further comprising:
in response to determining that the eyes of the person have opened subsequent to having been closed longer than the threshold period of time:
gradually reducing a level of activation of the one or more lenses that each comprise an electrochromatic lens over an interval of time to gradually return the one or more lenses to an undarkened state.

14. The method of claim 13, further comprising gradually increasing the brightness of the AR imagery in relation to brightness of the ambient light allowed through the one or more electrochromatic lenses.

15. The method of claim 9, further comprising activating the one or more lenses that each comprise an electrochromatic lens to a darker state in response to determining that the brightness of the ambient light exceeds a brightness limit threshold associated with effective presentation of the AR imagery.

16. The method of claim 9, further comprising activating the one or more lenses that each comprise an electrochromatic lens to a darker state in response to determining that: (i) a level of increase in the brightness of the ambient light is greater than a brightness increase threshold; and (ii) the increase occurs in less than a second threshold period of time.

17. A computer program product comprising:
a computer readable storage device; and
program code on the computer readable storage device that when executed by a processor associated with an electronic device, the program code enables the electronic device to provide functionality of:
monitoring at least one first camera sensor that detects ambient light at an augmented reality (AR) display device comprising eyeglasses having one or more lenses configured to be positioned in front of eyes of a person;
detecting brightness of the ambient light;

dynamically adjusts brightness of AR imagery in relation to the brightness of the ambient light, the AR imagery projected by an AR projector and displayed on the one or more lenses;

monitoring at least one second camera sensor configured to detect whether the eyes of the person are open or closed; and reducing the brightness of the AR imagery in response to a brightness context of determining that the eyes of the person have been closed for longer than a threshold period of time.

18. The computer program product of claim 17, wherein the program code enables the electronic device to provide the functionality of ramping up the brightness of the AR imagery over an interval of time in response to determining that the eyes of the person have opened subsequent to having been closed longer than the threshold period of time.

19. The computer program product of claim 17, wherein the program code enables the electronic device to provide the functionality of:

activating the one or more lenses that each comprise an electrochromatic lens to a darker state in response to determining that the eyes of the person have been closed longer than threshold period of time;

dynamically adjusting brightness of the AR imagery in relation to the brightness of the ambient light that is transmitted through the one or more electrochromatic lenses;

in response to determining that the eyes of the person have opened subsequent to having been closed longer than the threshold period of time:

gradually reducing a level of activation of the one or more lenses that each comprise an electrochromatic lens over an interval of time to gradually return the one or more lenses to an undarkened state; and gradually increasing the brightness of the AR imagery in relation to brightness of the ambient light allowed through the one or more electrochromatic lenses.

20. The computer program product of claim 17, wherein the program code enables the electronic device to provide the functionality of:

activating the one or more lenses that each comprise an electrochromatic lens to a darker state in response to determining that the brightness of the ambient light exceeds a brightness limit threshold associated with effective presentation of the AR imagery; and activating the one or more electrochromatic lens to a darker state in response to determining that: (i) a level of increase in the brightness of the ambient light is greater than a brightness increase threshold; and (ii) the increase occurs in less than a threshold period of time.

* * * * *